United States Patent [19]

Lyons

[11] 4,228,837
[45] Oct. 21, 1980

[54] LOCKING WASHERS

[76] Inventor: Keith Lyons, 37 Heswall Mount, Thingwall, Wirral, Cheshire, England

[21] Appl. No.: 899,779

[22] Filed: Apr. 25, 1978

[30] Foreign Application Priority Data

Apr. 28, 1977 [GB] United Kingdom ............... 17740/77

[51] Int. Cl.³ ......................... F16B 39/14; F16B 39/02
[52] U.S. Cl. ............................... 151/35; 151/14 DW; 151/30
[58] Field of Search ................. 151/3, 14 DW, 15, 35, 151/37, 30

[56] References Cited

U.S. PATENT DOCUMENTS

| 331,169 | 11/1885 | Thomas | 151/35 |
|---|---|---|---|
| 779,751 | 1/1905 | Waitt | 151/35 |
| 915,830 | 3/1909 | Craven | 151/14 DW |
| 1,821,312 | 9/1931 | Lillig | 151/35 |
| 2,102,098 | 12/1937 | Sickles et al. | 151/15 X |

FOREIGN PATENT DOCUMENTS

| 5561 | of 1914 | United Kingdom | 151/35 |
|---|---|---|---|
| 345824 | 4/1931 | United Kingdom . | |
| 786713 | 11/1957 | United Kingdom . | |
| 907826 | 10/1962 | United Kingdom . | |
| 987685 | 3/1965 | United Kingdom . | |
| 1082816 | 9/1967 | United Kingdom . | |
| 1147878 | 4/1969 | United Kingdom . | |
| 1476920 | 6/1977 | United Kingdom . | |

Primary Examiner—Rodney H. Bonck
Attorney, Agent, or Firm—Geoffrey R. Myers

[57] ABSTRACT

The invention relates to a washer having a screw-thread formed in a central bore thereof to enable the washer to be screwed onto a screw-threaded member the washer being adapted for tensioning itself against a surface when screwed up against the surface for increasing friction between the washer and the screw-threaded member; and at least one portion of the washer providing an inwardly extending edge frictionally engageable with said surface when the washer is screwed up against said surface for inhibiting unscrewing of the washer relative to the surface.

2 Claims, 3 Drawing Figures

U.S. Patent     Oct. 21, 1980     4,228,837
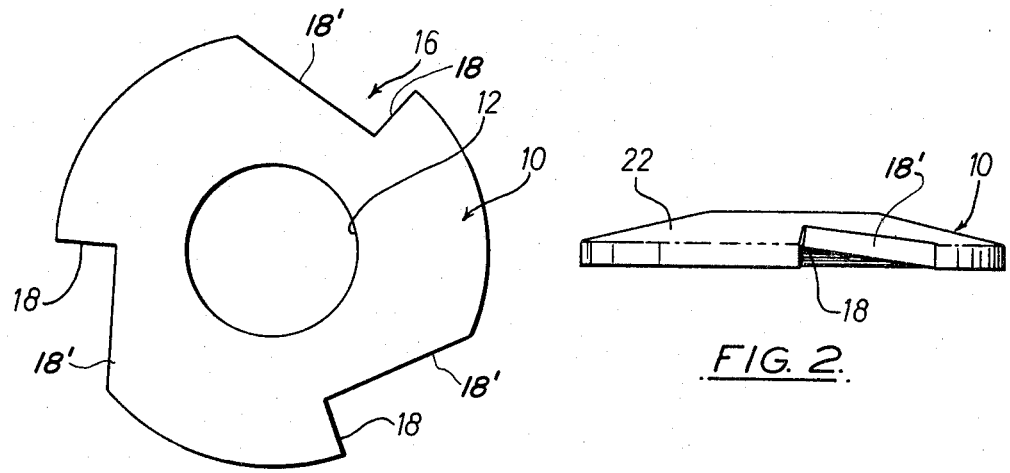
FIG. 1.
FIG. 2.
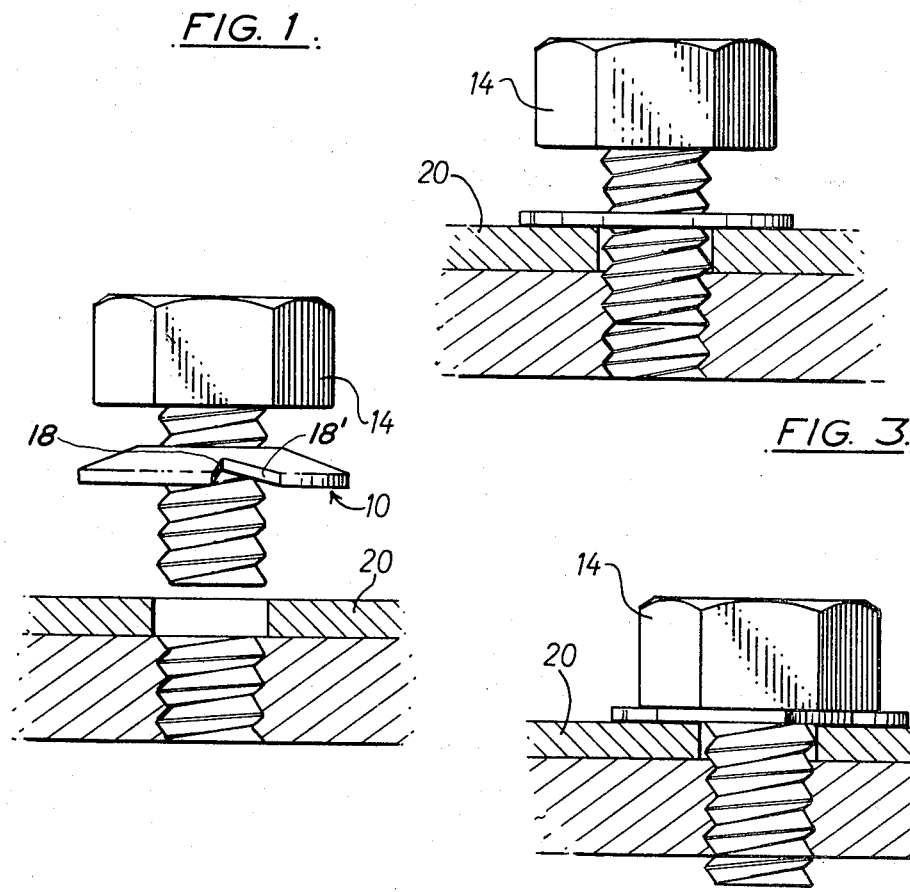
FIG. 3.

LOCKING WASHERS

This invention relates to locking washers for nuts, bolts or self tapping screws.

The present invention provides a washer having a screw-thread formed in a central bore thereof to enable the washer to be screwed onto a screw-threaded member, the washer being adapted for tensioning itself against a surface when screwed up against the surface for increasing friction between the washer and the screw-threaded member; and at least one of the washer portions providing an inwardly extending edge frictionally engageable with said surface when the washer is screwed up against said surface for inhibiting unscrewing of the washer relative to the surface.

The washer may be made of spring steel or plastics or other suitable material.

The present invention is further described hereinafter, by way of example, with reference to the accompanying drawings in which:

FIG. 1 is a plan view of one embodiment of a washer according to the present invention;

FIG. 2 is a side elevation of the washer of FIG. 1;

FIG. 3 is a partial section showing the washer on a bolt;

FIG. 4 is a partial section of the bolt partially screwed into a workpiece; and

FIG. 5 shows the washer fully compressed by the bolt against the workpiece.

The drawings illustrate a washer 10 which is substantially dish-shaped, having a substantially convex upper surface 22 and concave lower surface, and has a screw-threaded central bore 12. The washer may of course be planar or of other suitable shape but a dish-shaped washer is to be preferred. Advantageously, especially for thin washers, the screw-thread is formed by the edge of the bore, which edge is helical, (not shown in the drawing) forming not more than one thread revolution. Alternatively the washer may be of sufficient thickness to allow more than one, or two or more thread revolutions to be formed in the central bore 12. Preferably the dimensions of the screw-thread of the washer are such that the washer forms a running screw fit on a screw-threaded member such as a bolt 14 or screw (not shown).

The washer also has recesses in the form of cut-away portions 16 formed in the periphery of the washer to provide inwardly radially extending edges 18 and edges 18' passing substantially normally thereto, whereby the edges 18 are not faced by the edges 18'. The latter serve to increase frictional engagement of the washer with a workpiece 20 when the washer is compressed against the workpiece by a head of the bolt 14 by catching on the surface of the workpiece 20 and for this purpose may be depressed or deformed to project slightly below the lower surface of the washer although where the latter is dish-shaped this may be omitted.

The edges 18 may be chamfered. Ridges may be formed on the washer surface additional or alternative to the cut away portions to perform the same function.

In use the washer is screwed onto an externally screw-threaded member such as the bolt 14 with the substantially concave surface of the washer facing the workpiece. The degree of curvature of the washer may be chosen to suite a required locking strength. The bolt is then passed through a bore in the workpiece 20 and screwed into a screw-threaded bore in a member to which the workpiece 20 is to be bolted. The preferable running fit of the washer screw-thread on the bolt reduces friction between the two to less than that between the washer and workpiece so that the washer provides little resistance to the bolt being screwed into the bore until the head of the bolt reaches the washer.

Once slackness between the member, workpiece, washer and bolt has been taken up further screwing of the bolt is resisted by the washer since additional torque must be applied to the bolt to compress or flatten the washer. The resistance of the latter to compression by virtue of its shape is exhibited by a considerably increased friction between the screw-threads of the bolt and washer, and, of course, while this increased friction is maintained it is extremely difficult to unscrew the bolt. In the case of a planar washer this increased friction is created by the depressed or deformed edges 18.

In addition, in the washer's compressed state the edges 18 bite into the workpiece to increase the friction between the washer and workpiece to an amount considerably greater than that between the washer and the bolt. This means, of course that when an attempt is made to unscrew the bolt the washer preferentially remains stationary relative to the workpiece and in form frictional contact therewith, thus maintaining the increased friction between the washer threads and the bolt as the bolt is unscrewed from the workpiece, and also clamping the workpiece to the member. In other words, when the washer is screwed up and tensioned against the surface and in flattened condition, there is exerted a constant locking force by the washer regardless of the position to which the bolt member is thereafter screwed. A high resistance to the bolt unscrewing is thus maintained until the bolt threads clear the workpiece.

Therefore, if the bolt is acted upon by a force, such as vibration, which could normally cause the bolt to unscrew from the member the considerate friction between the washer and the bolt will resist unscrewing of the bolt not only for the first few turns thereof but for the full unscrewing length of the bolt. The workpiece originally clamped by the bolt head is, therefore, clamped by the washer for the full unscrewing length of the bolt.

Where the washer is used with a nut on a stud the the washer, if mounted on the stud with its concave surface facing the workpiece, will maintain the workpiece clamped in position but will not resist unscrewing of the nut. However when inverted the washer will co-operate with the nut to resist unscrewing of the nut. A planar washer, for example with edges 18 deformed both upwardly and downwardly will serve both purposes i.e. will resist unscrewing of the washer relative to the workpiece and the nut relative to the washer.

The washer of the invention may be used in conjunction with a bolt which at some point along its length has an unthreaded portion. This portion serves to retain the washer on the bolt between the unthreaded portion and the bolt head unless unscrewed therefrom by a user.

The number of recesses formed in the washer of the present invention may of course be varied.

Finally, the washer of the present invention may be used with self-tapping screws in similar manner to the above-described use with bolts.

I claim:

1. A washer having a screw-thread formed in a central bore thereof to enable the washer to be screwed onto a screw-threaded bolt member the washer being adapted for tensioning itself against a surface when screwed up against the surface for increasing friction between the washer and the screw-threaded member; wherein the washer is resilient and substantially dish-shaped for tensioning itself against said surface, and is formed with at least one peripheral recess therein defined by two edges one of which passes substantially radially inwardly from the periphery of the washer and the other of which passes along a line such that said one edge is not faced by said other edge of the recess, such that when said washer is screwed up and tensioned against said surface and in flattened condition, there is exerted a constant locking force by said washer regardless of the position to which the bolt member is thereafter screwed.

2. A washer as claimed in claim 1 wherein said other edge lies substantially normal to said one edge.

* * * * *